United States Patent
Jones

(10) Patent No.: US 7,672,077 B2
(45) Date of Patent: Mar. 2, 2010

(54) AUTO LOADING DEVICE FOR DATA STORAGE CARTRIDGES

(75) Inventor: David E. Jones, Layton, UT (US)

(73) Assignee: Iomega Corporation, San Diego, CA (US)

( * ) Notice: Subject to any disclaimer, the term of this patent is extended or adjusted under 35 U.S.C. 154(b) by 807 days.

(21) Appl. No.: 11/478,557

(22) Filed: Jun. 29, 2006

(65) Prior Publication Data

US 2007/0074232 A1    Mar. 29, 2007

Related U.S. Application Data

(60) Provisional application No. 60/720,767, filed on Sep. 26, 2005.

(51) Int. Cl.
*G11B 15/68* (2006.01)
*G11B 17/22* (2006.01)

(52) U.S. Cl. ..................... 360/92.1; 720/634

(58) Field of Classification Search ............. 720/600, 720/630, 634; 360/92.1; 369/30.41, 30.42, 369/30.47, 30.49, 30.66, 30.68, 30.74
See application file for complete search history.

(56) References Cited

U.S. PATENT DOCUMENTS

| | | | | |
|---|---|---|---|---|
| 5,936,918 A * | 8/1999 | Ohba et al. | ......... | 369/30.31 |
| 6,229,666 B1 * | 5/2001 | Schneider et al. | ......... | 360/92.1 |
| 6,233,111 B1 * | 5/2001 | Schneider et al. | ......... | 360/92.1 |
| 6,236,530 B1 * | 5/2001 | Schneider et al. | ......... | 360/92.1 |
| 6,310,745 B1 * | 10/2001 | Smith | ......... | 360/96.51 |
| 6,433,954 B1 * | 8/2002 | Rinard et al. | ......... | 360/92.1 |
| 6,771,457 B2 * | 8/2004 | Flaherty et al. | ......... | 360/92.1 |
| 6,865,640 B2 | 3/2005 | Dimitri et al. | | |
| 6,943,982 B2 * | 9/2005 | Flaherty et al. | ......... | 360/92.1 |
| 7,019,940 B2 * | 3/2006 | Smith et al. | ......... | 360/92.1 |
| 7,283,322 B2 * | 10/2007 | Kubota | ......... | 360/96.51 |
| 7,508,621 B2 | 3/2009 | Pollard et al. | | |
| 2004/0021978 A1 * | 2/2004 | Flaherty et al. | ......... | 360/92 |
| 2004/0021979 A1 * | 2/2004 | Flaherty et al. | ......... | 360/92 |
| 2005/0080993 A1 * | 4/2005 | Shiraishi et al. | ......... | 711/115 |
| 2005/0275965 A1 * | 12/2005 | Herring et al. | ......... | 360/92 |

FOREIGN PATENT DOCUMENTS

EP    622796 A2 *  11/1994

(Continued)

OTHER PUBLICATIONS

English-machine translation of Kurozuka et al. (JP 08-190760 A), published on Jul. 23, 1996.*

*Primary Examiner*—William J Klimowicz
(74) *Attorney, Agent, or Firm*—Stephen C. Beuerle; Procopio Cory Hargreaves & Savitch LLP

(57) ABSTRACT

A vertical autoloader design enables multiple data cartridges to be selectively loaded into a drive while minimizing the device footprint. The structure of the vertical autoloader incorporates Geneva steps into the walls of the autoloader. The Geneva steps interface with gearing on a drive carriage to move the drive vertically. The data cartridges are inserted into slots on the front of the vertical autoloader, and the data cartridges not currently loaded into the drive can be removed and replaced while the autoloader is in operation. Further, the vertical autoloader includes prevent devices in the cartridge slots to ensure the data cartridges are loaded correctly.

17 Claims, 6 Drawing Sheets

FOREIGN PATENT DOCUMENTS

| | | | | |
|---|---|---|---|---|
| EP | 793226 A1 | * | 9/1997 |
| JP | 60066358 A | * | 4/1985 |
| JP | 02079251 A | * | 3/1990 |
| JP | 02094158 A | * | 4/1990 |
| JP | 05234223 A | * | 9/1993 |
| JP | 08007423 A | * | 1/1996 |
| JP | 08055414 A | * | 2/1996 |
| JP | 08190760 A | * | 7/1996 |
| JP | 09017091 A | * | 1/1997 |
| JP | 09180392 A | * | 7/1997 |
| JP | 09198767 A | * | 7/1997 |
| JP | 09204726 A | * | 8/1997 |
| JP | 11007686 A | * | 1/1999 |
| JP | 11110940 A | * | 4/1999 |
| JP | 11306634 A | * | 11/1999 |
| JP | 2000276829 A | * | 10/2000 |
| JP | 2005222694 A | * | 8/2005 |

* cited by examiner

AUTO LOADING DEVICE FOR DATA STORAGE CARTRIDGES

CROSS-REFERENCE TO RELATED APPLICATIONS

The present application claims priority from U.S. Provisional Application 60/720,767 filed Sep. 26, 2005.

TECHNICAL FIELD

This invention relates to removable physical data storage devices, and more particularly to an autoloading device for data storage cartridges.

BACKGROUND

A popular device for handling large amounts of information in a data processing system is an automated data cartridge loader (autoloader). Autoloaders store and manage large numbers of data cartridges containing media on which data is recorded. These cartridges are typically tape media, but recently autoloaders have been introduced using hard disk cartridges. One such autoloader is the SCSI Autoloader from Iomega Corporation, which incorporates its exclusive REV® drive and REV® disk cartridges in the autoloader design.

One problem in the field of autoloaders is to increase the storage density while decreasing the equipment storage area required for the autoloaders. Autoloaders are widely accepted because they combine multiple data cartridges and a drive within a single chassis for higher data storage capacity. Typically, prior art autoloaders have an array of storage positions for data cartridges, one or more drives, and some type of automated changer or cartridge transport for picking or gripping a data cartridge and moving the data cartridge between a storage position and the drive. The robotic mechanism, often called a "picker", is typically mounted to the autoloader chassis relative to the drive in order to move the data cartridges between a storage position and the drive.

A typical picker mechanism automatically exchanges the individual data cartridges between their storage locations and the drive. Different types of data cartridge retrieval/transport mechanisms are used to accommodate the various data cartridge arrangements in different data cartridge library systems. One example of a data cartridge retrieval/transport mechanism utilizes a rotatable robotic arm with an optical sensor for selecting and retrieving the correct data cartridge and transporting the data cartridge to the one or more drives. Another example of a data cartridge retrieval/transport mechanism is a linear robotic mechanism that moves along an X-Y translation or about a pivot in a rotary motion to select, retrieve and transport data cartridges to the one or more drives. The drive is operable to read/write data from or to the media in the data cartridge. A host computer that communicates with a library control unit typically controls operation of the autoloader. In all of these architectures, the data cartridge retrieval/transport mechanism is a complex mechanism which must translate among the multitude of fixed data cartridge storage locations, moving in three dimensions to retrieve selected data cartridges for insertion into the drive. The complexity of this data cartridge retrieval/transport mechanism accounts for a significant component of the cost of the autoloader and requires a significant amount of space to implement.

Therefore, there exists a need in the art of data storage for an autoloader that simplifies the storage and handling of large amounts of information, reduces the size of the system and space required for data storage, while at the same time being cost effective and simple.

SUMMARY

A vertical autoloader design enables multiple data cartridges to be selectively loaded into a drive while minimizing the device footprint. The structure of the vertical autoloader incorporates Geneva steps into the walls of the autoloader. The Geneva steps interface with gearing on a drive carriage to move the drive vertically. The data cartridges are inserted into slots on the front of the vertical autoloader, and the data cartridges not currently loaded into the drive can be removed and replaced while the autoloader is in operation. Further, the vertical autoloader includes prevent devices in the cartridge slots to ensure the data cartridges are loaded correctly.

DESCRIPTION OF DRAWINGS

These and other features and advantages of the invention will become more apparent upon reading the following detailed description and upon reference to the accompanying drawings.

DETAILED DESCRIPTION

Figure 1:
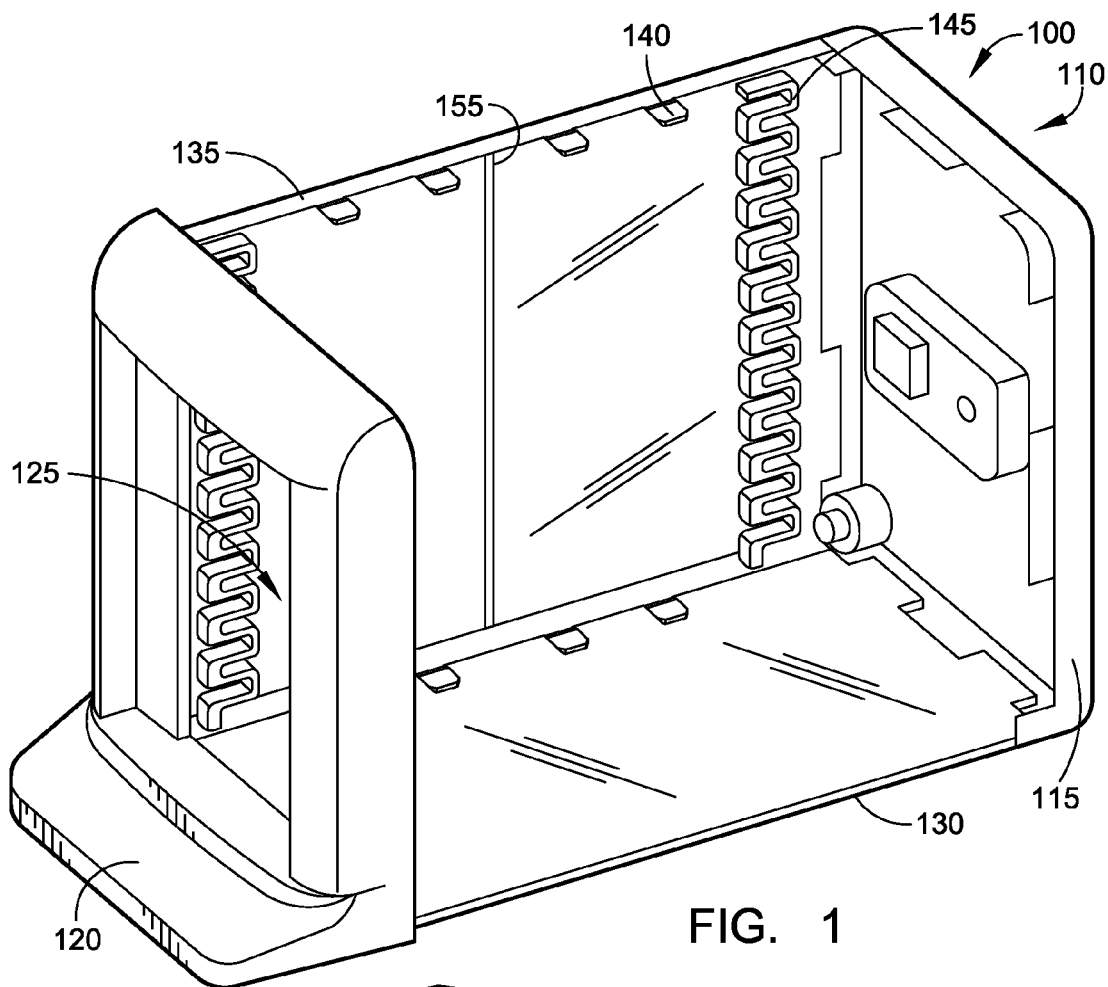
FIG. 1 illustrates the housing of an autoloader having interlocking tabs along all edges of the present invention (top and foreground side panel removed).

An autoloader using vertical movement can be used to minimize the footprint required for the device. FIG. 1 illustrates the housing 100 of a vertical autoloader 110 having interlocking tabs 140 along all edges of the present invention (with the top and foreground side panel removed). The housing 100 comprises a bottom panel 130, a front panel 120, a back panel 115, a first side panel 135 (a second side panel is not shown), and a top panel (not shown). The front panel 120 includes a cutout aperture 125 for the cartridge slots. The height of the vertical autoloader 110 may vary depending on the number of cartridges the autoloader 110 is designed to hold. The side panel 135 also includes a rib 155 which is used to ensure alignment of a drive carriage as will be described below.

Prior art for the construction of a device like the vertical autoloader 110 consists of various sheet metal parts fastened together with screws to form a rigid support structure. Because of the limited types of features that can be made during the forming of a flat metal blank, additional parts are added as kinematic (typically guiding, locating or motive) features. Also, since the sheet metal structure is typically not visually appealing, the housing may be covered with additional, cosmetic, largely nonfunctional sheet metal or plastic facades.

One embodiment of the vertical autoloader 110 improves on this by using molded plastic to form each of the panels of the housing 100. The molded plastic components of the housing 100 may include interlocking tabs 140 to force the cosmetic enclosures into rigid alignment. Also, functional features such as a lifting mechanism 145 can be molded directly into the housing 100.

Figure 2:
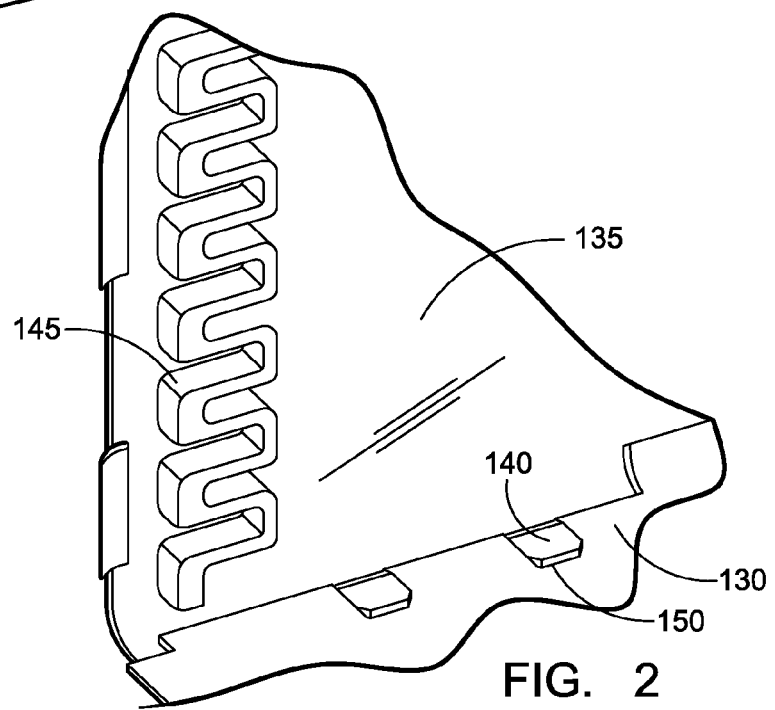
FIG. 2 illustrates geneva steps molded into the side panel of the autoloader frame.

FIG. 2 illustrates Geneva steps as the lifting mechanism 145 molded into the side panel 135 of the housing 100. The Geneva steps 145 may be included proximate both the front panel 120 and the rear panel 115 of the housing 100. Complementary Geneva steps 145 are included on the second side panel (not shown). The complete Geneva steps 145 cooperate with a corresponding Geneva gear on a drive carriage and will be described below.

FIG. 2 also shows the interaction of the interlocking tabs 140 to create the rigid housing 100. As shown, tabs 140 on the side panel 135 may interface with corresponding cutouts 150 on the bottom panel 130. Thus, the cost of forming the housing can be minimized while an attractive, rigid housing 100 is obtained. Interlocking tabs 140 are formed along all edges of all exterior parts. The tabs are shaped so that there is zero clearance between mating tabs. The net effect is to prevent any shearing motion between components. Therefore, the torsional stiffness of the assembled structure is very high without resorting to the use of sheet metal parts. Symmetry is exploited so that the two sides and the top and bottom are identical parts thus saving tooling costs and resulting in a lower part cost.

Use of the interlocking tabs 140 eliminates many small fasteners that would normally be required to bind various pieces of sheet metal together to achieve the same structural integrity. In place of these many small fasteners, four long draw screws (not shown) may be used to pull the front panel 125 and rear panel 115 together to trap the tabs 140 and finish the assembly.

Figure 3:
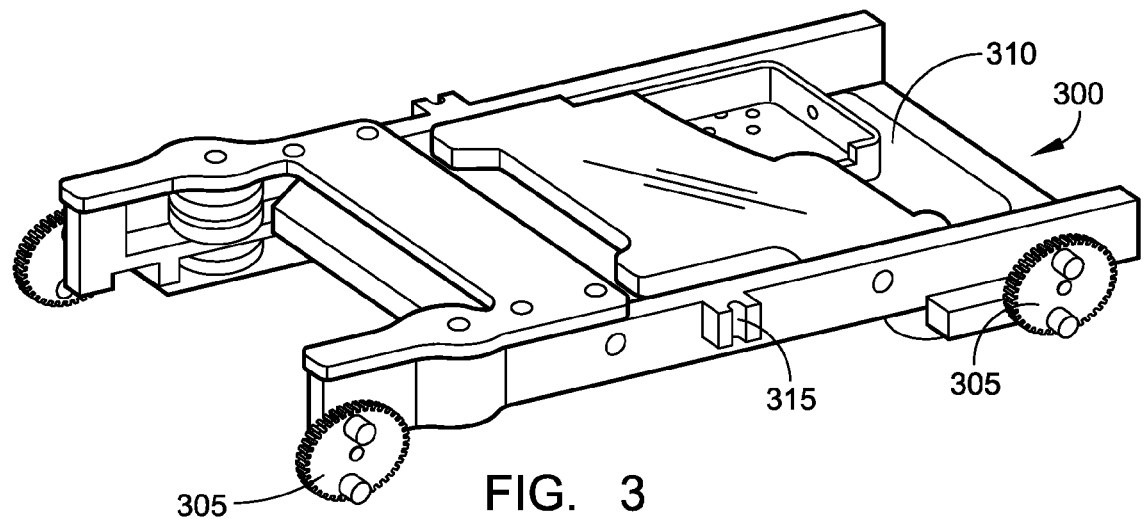
FIG. 3 illustrates a drive carriage having geneva wheels for interacting with the Geneva steps shown in FIG. 2.

FIG. 3 illustrates a drive carriage 300 having geneva wheels 305 for interacting with the Geneva steps shown in FIG. 2. The drive carriage 300 is adapted to hold a drive 310 which is moved vertically within the housing 100. The drive 310 may be a tape drive or any type of drive that accepts removable cartridges. Preferably, the drive 310 is a REV® drive by Iomega Corporation. The REV drive accepts hard disk cartridges, which provides a faster, more reliable, and cheaper to tape drives and cartridges. The drive carriage 300 also includes a rib mating slot 315. There is a slot 315 on each side of the carriage 300. The vertical rib 155 (FIG. 1) engages the mating slot 315 as the carriage moves vertically within the housing 100. The vertical rib 155 and mating slot 315 assist the smooth movement of the carriage 300 due to forces on the carriage 300 from friction by the pins 325 sliding on the Geneva steps 145 in the side-panel.

Figure 4:
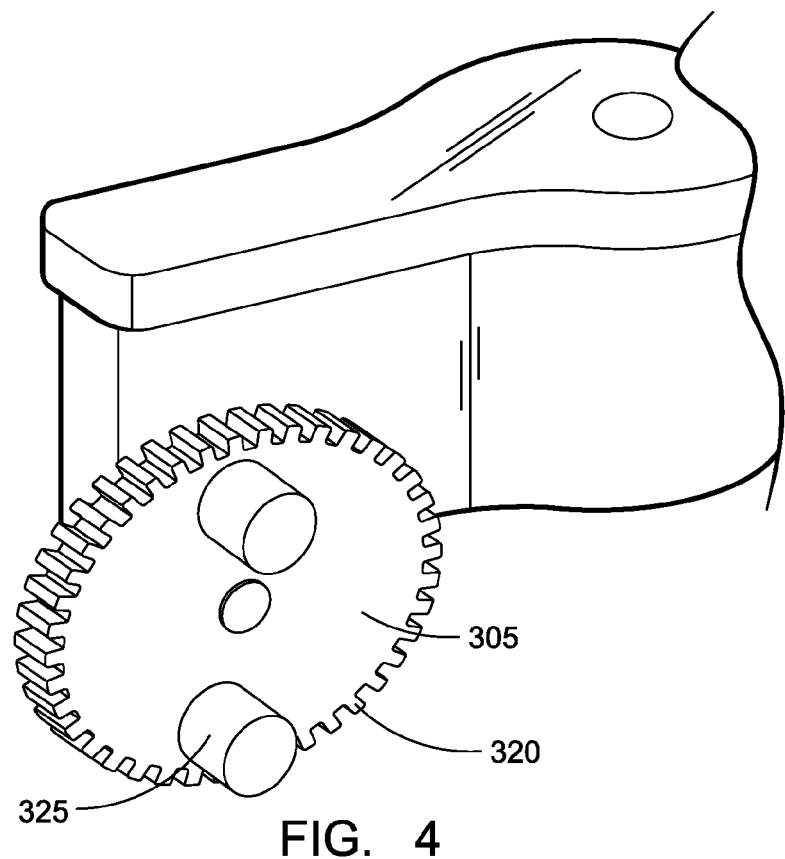
FIG. 4 illustrates a detailed view of one of the geneva wheels of FIG. 3.

FIG. 4 illustrates a detailed view of one of the Geneva wheels 305 of FIG. 3. The Geneva wheels 305 include gearing 320 and pins 325. The pins 325 on the Geneva wheels 305 engage the Geneva steps 145 on the side panels. A motor (not shown) is used to turn the Geneva wheels 305 using the gearing 320. As the Geneva wheels 305 turn, the interaction of the pins 325 against the Geneva steps 145 causes the carriage 300 to move up and down depending on the direction of rotation of the Geneva wheels 305. Not shown are two timing belts, one on either side, that keep the four wheels in synchrony. The precision of the molded Geneva steps 145 may be used to ensure proper alignment of a cartridge opening of the drive 310 with the cartridge to be loaded.

Figure 5:
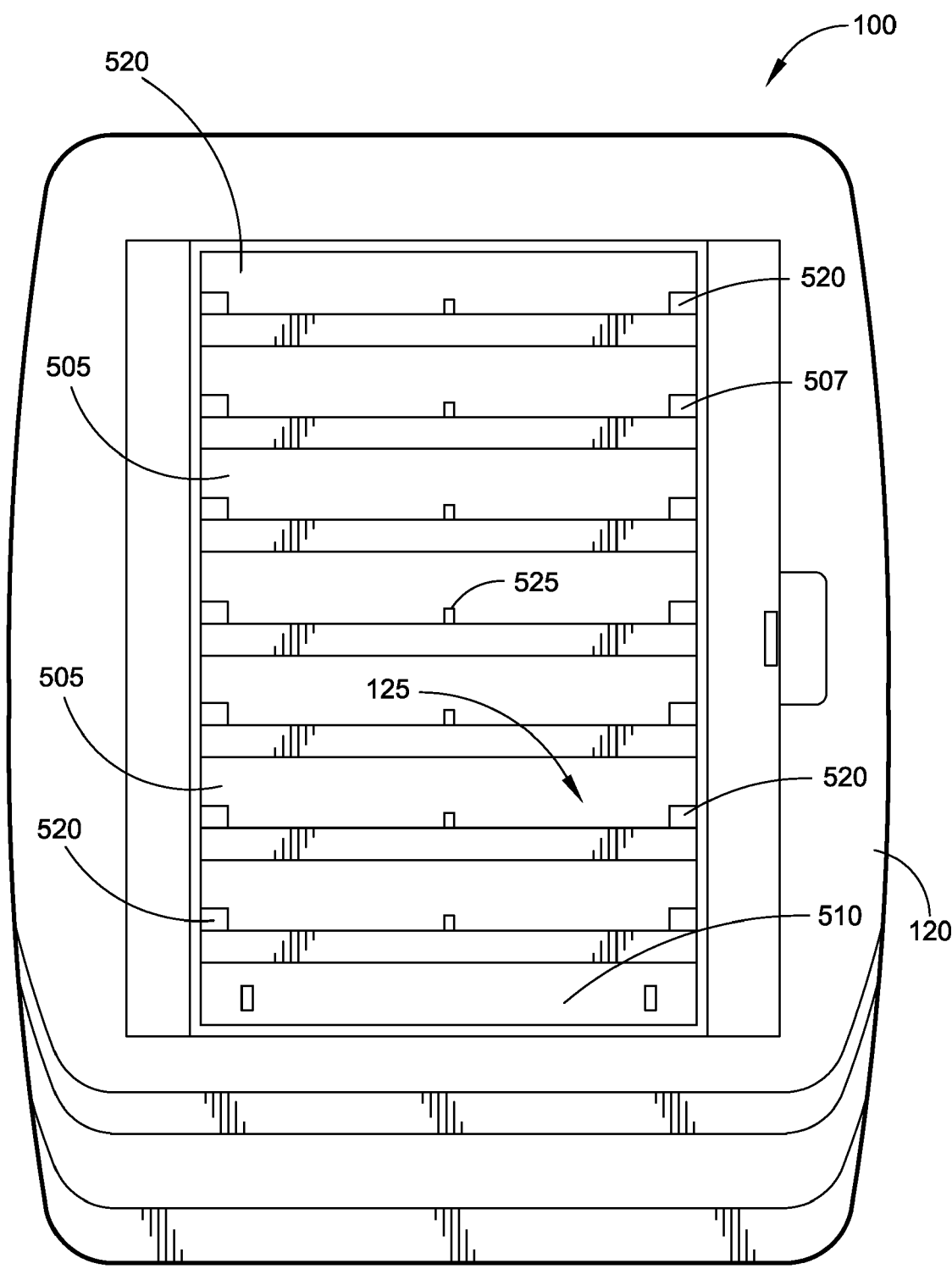
FIG. 5 is a front view of the autoloader frame showing the cartridge slots. The bottom slot has a cartridge in it. In each slot, Prevent device tabs are present on either side, and a Prevent device cam is present in the center.
Figure 6:
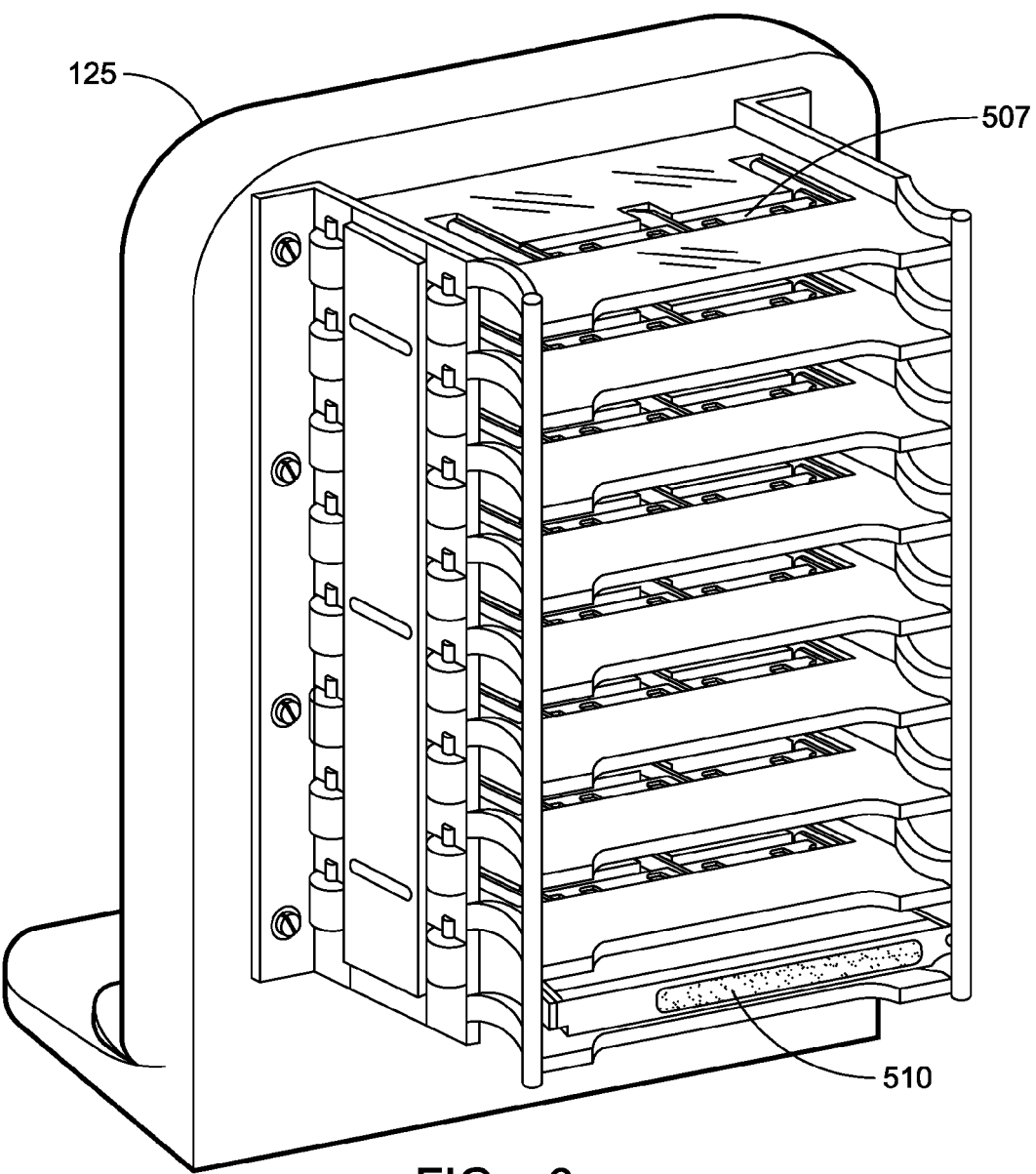
FIG. 6 is a rear isometric view of the back side of the front panel and sleeve wall assembly. A cartridge is shown inserted and registered in the bottom slot. The Prevent device that controls cartridge orientation during insertion is just visible on the top of each horizontal plate.
Figure 7:
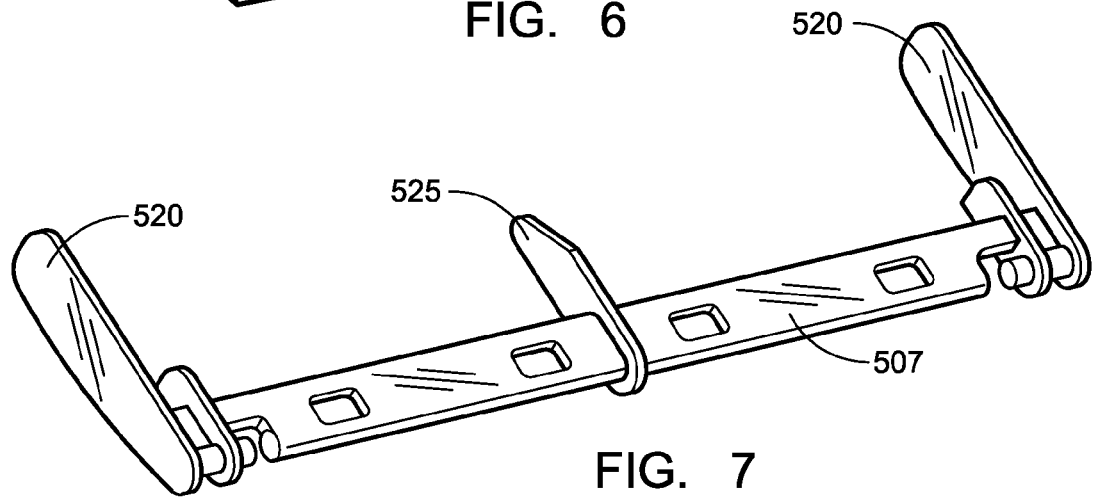
FIG. 7 illustrates the prevent device shown in FIG. 6.

FIG. 5 is a front view of the autoloader housing 100 showing cartridge slots 505. FIG. 6 is a rear isometric view of the back side of the autoloader housing 100 of FIG. 5. The bottom slot of autoloader housing 100 has a cartridge 510 installed for illustrative purposes. In each slot 505, a prevent device 507 is installed. The prevent device 507 includes tabs 520 on each side, and a cam 525 in the center. A detailed view of the prevent device 507 and the tabs 520 and cam 525 is seen in FIG. 7.

Figure 8:
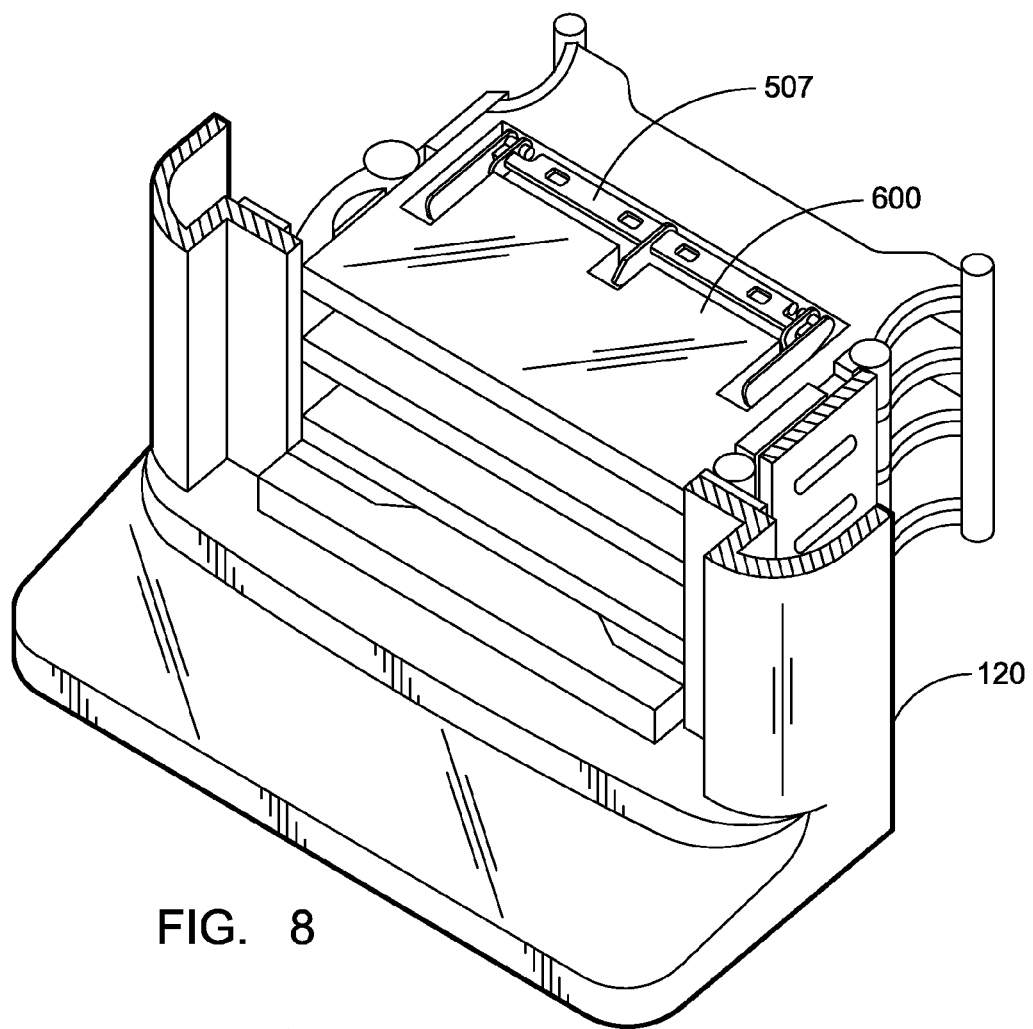
FIG. 8 is an isometric cross-section of the front panel showing the Prevent device in one of the slots.

FIG. 8 is an isometric cross-section of the front panel showing the prevent device 507 in one of the slots. The prevent device 507 is installed on a sleeve plate surface 600 in each cartridge slot 125. The prevent device 507 cooperates with the sleeve plate surface to control cartridge 510 insertion as will be described below.

Figure 9:
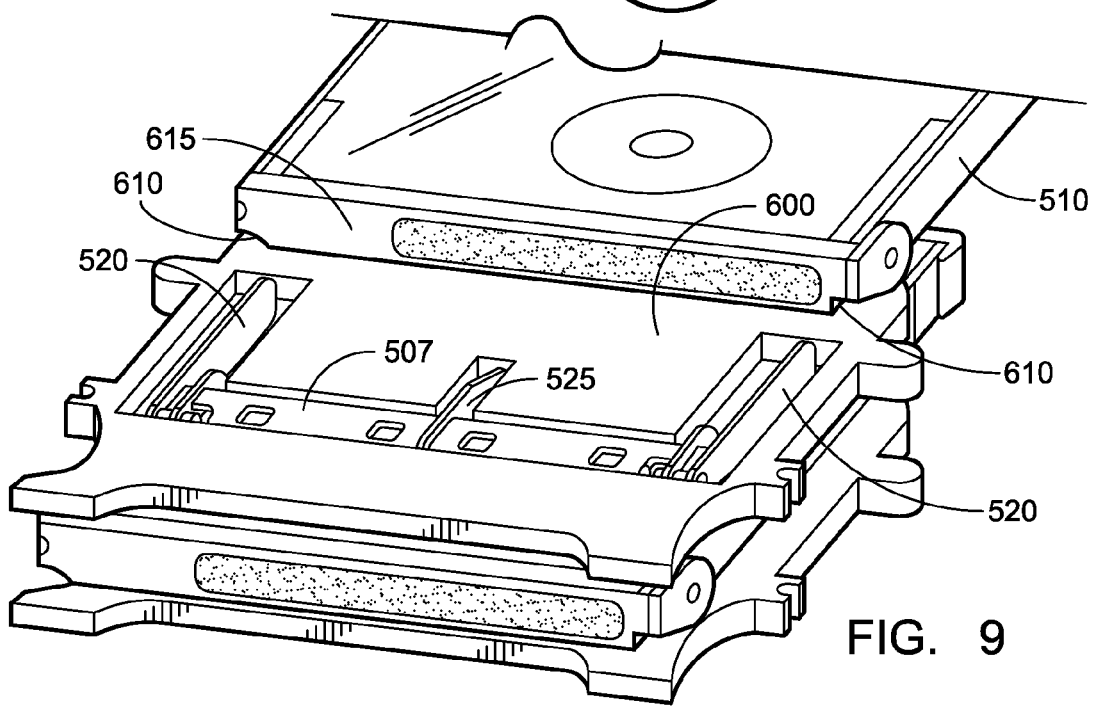
FIG. 9 is a rear isometric view of a cartridge being inserted. The prevent device is in the spring loaded up position. The slots on the underside of the cartridge can be seen to be aligned with the tabs on the end of the prevent device.

FIG. 9 is a rear isometric view of a cartridge 510 being inserted into a cartridge slot 125. The prevent device 507 is in the spring loaded up position. Slots 610 on the underside of the cartridge 510 can be seen to be aligned with the tabs 520 on the end of the prevent device 507. The bottom of a data cartridge may have a slot 610 on either side that extends from the front of the cartridge roughly one-third the length of the cartridge. The prevent device 507 has a tab 520 at either end that is aligned with the cartridge slots while the cartridge is being properly inserted. As the cartridge slides in, the tabs 520 slide into the slots 610 for a predetermined distance (approximately 15 mm for a REV cartridge). Once this distance is achieved, the cam 525 contacts the leading edge 615 of the moving cartridge. Because of the angle on the cam 525, the prevent device 507 is forced to rotate downward, lowering the tabs 520 until they are flush with the sleeve plate surface 600 in the cartridge slot 505. This moves the tabs 520 out of the way before they can engage the end of the slots 520 in the cartridge bottom.

Figure 10:
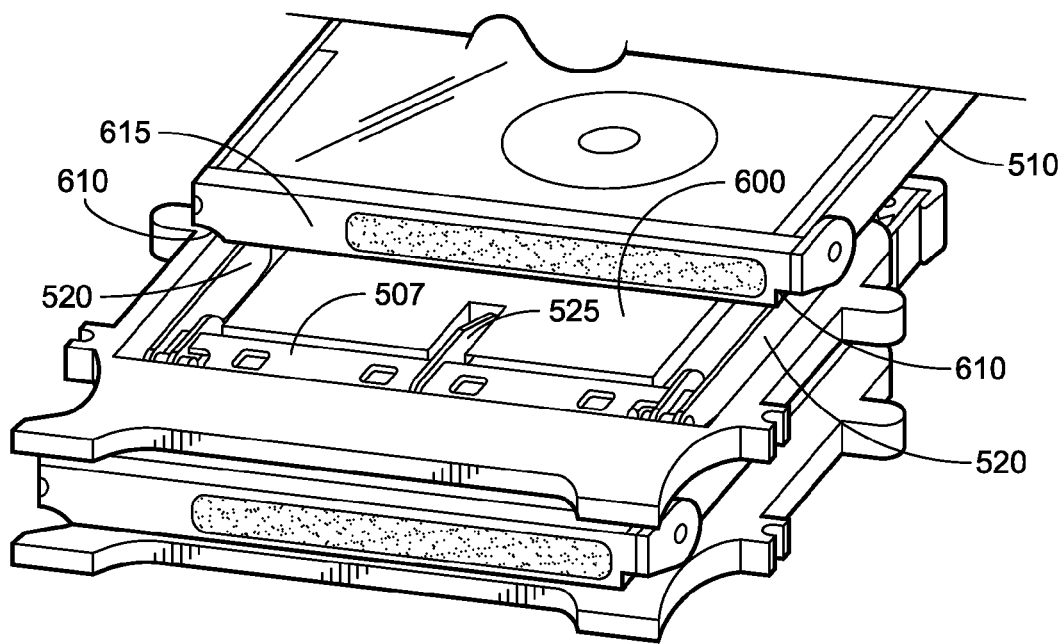
FIG. 10 illustrates a cartridge inserted past the tabs but just engaging the cam.

FIG. 10 illustrates a cartridge 510 inserted past the tabs 520 but just engaging the cam 525. The tabs 520 have engaged the slots 610 in the bottom of the cartridge 510. The leading edge 615 of the cartridge 510 has just contacted the center cam 525 which will lower the tabs out of the way before they can reach the end of the slots 610.

Figure 11:
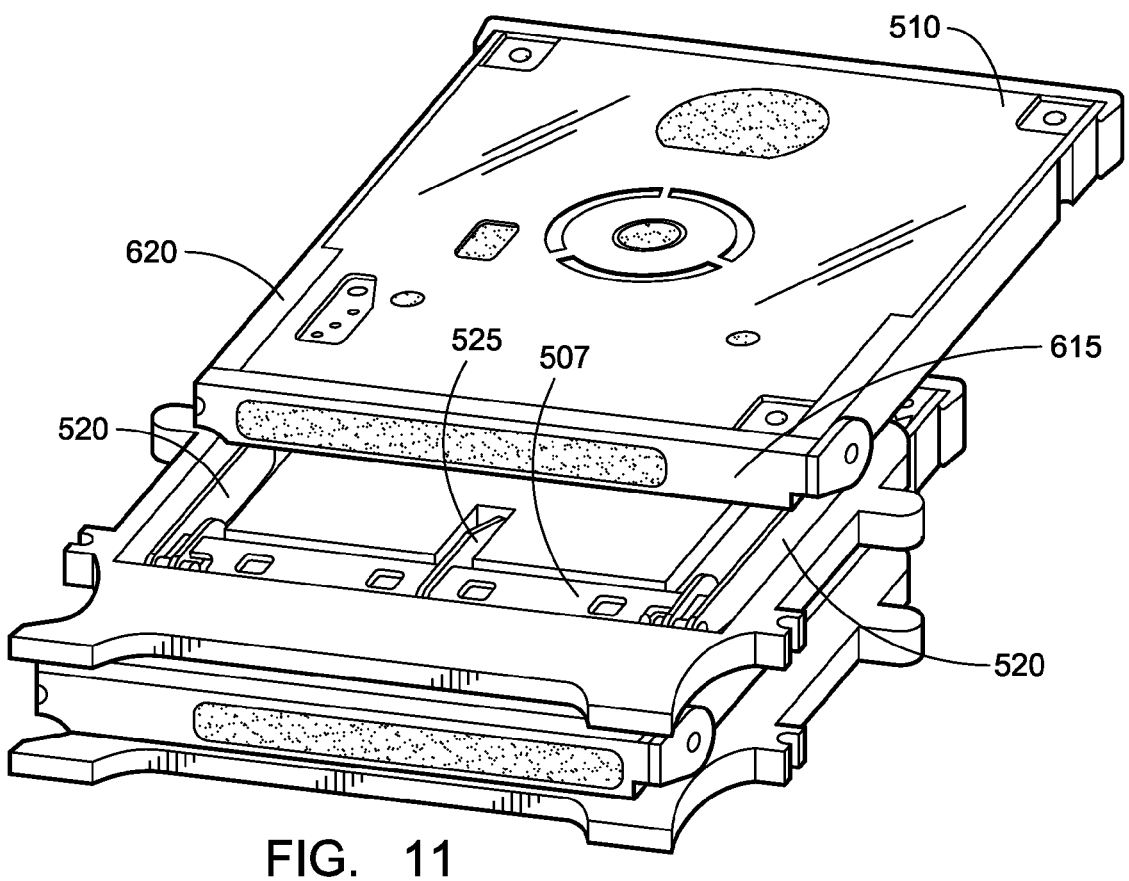
FIG. 11 illustrates the prevent device interacting with a cartridge that is inserted incorrectly.

FIG. 11 illustrates the prevent device 507 interacting with a cartridge 510 that is inserted incorrectly. If the cartridge 510 is inserted in any other orientation, the tabs 520 of the prevent device 507 engages the leading surface 615. Because the cartridge 510 is inserted incorrectly, the slots 620 are not properly positioned and therefore no slots 620 are available for the tabs 520 to slide. In the example of FIG. 11, the cartridge 520 is being inserted upside down. The tabs 520 contact the leading edge 620 of the inserting cartridge 520 before the cam 525 can be engaged to lower them out of the way. Thus, the cartridge 520 is stopped from being inserted by the prevent device 507.

A special case of unwanted cartridge orientation will now be discussed. Since the REV cartridge 520 is shorter in the direction of insertion than the width, putting the cartridge in sideways is more difficult to prevent than other orientations.

However, it is possible for the cartridge 520 to be inserted upside down, sideways and skewed (to the extent allowed by the cartridge slot) such that only one of the prevent tabs 520 contacts the leading edge 620 of the cartridge 520. In this case, the cam 525, being positioned in the center of the prevent device 507, is not contacted. Thus the tab 520 is not lowered, and insertion is prevented.

Numerous variations and modifications of the invention will become readily apparent to those skilled in the art. Accordingly, the invention may be embodied in other specific forms without departing from its spirit or essential characteristics.

What is claimed is:

1. An autoloader for a data cartridge including an underside with a slot, comprising:
    a housing having a plurality of data cartridge slots;
    a drive that is movable between the data cartridge slots; and
    a prevent device located within each of the plurality of data cartridge slots,
    wherein the prevent device prohibits insertion of a data cartridge into the data cartridge slot if the data cartridge is not properly oriented, the prevent device includes a positive insertion stop slidably receivable within the underside slot, the prevent device interacts with the drive to allow the cartridge to move beyond the positive insertion stop by slidably receiving the positive insertion stop in the underside slot for loading the cartridge into the drive when the drive is positioned at one of the plurality of data cartridge slots, the positive insertion stop includes a pair of tabs, and the underside slot includes a pair of underside slots configured to slidably receive the pair of tabs.

2. The autoloader of claim 1, wherein the cartridge is loaded into the drive using a simple rotary motion.

3. The autoloader of claim 1, wherein the data cartridge is shaped in a manner to interact with the prevent device when properly inserted into one of the plurality of data cartridge slots.

4. The autoloader of claim 1, wherein the underside slot extends along the underside of the cartridge less than the entire length of the cartridge.

5. The autoloader of claim 4, wherein the underside slot extends along the underside of the cartridge roughly one third the length of the cartridge.

6. The autoloader of claim 1, wherein the prevent device is spring-loaded.

7. The autoloader of claim 1, wherein the cartridge includes a leading edge and the prevent device includes a cam configured to engage the leading edge of the cartridge to cause the prevent device to be moved to an out-of-the-way position.

8. The autoloader of claim 7, wherein the cam is angled and the leading edge of the cartridge engages the angled cam, forcing the prevent device to rotate downward, lowering the positive insertion stop to the out-of-the-way position.

9. An autoloader for a data cartridge including an underside with a slot, comprising:
    a housing having a plurality of data cartridge slots;
    a drive that is movable between the data cartridge slots; and
    a prevent device located within each of the plurality of data cartridge slots,
    wherein the prevent device prohibits insertion of a data cartridge into the data cartridge slot if the data cartridge is not properly oriented, the prevent device includes a positive insertion stop slidably receivable within the underside slot, and the prevent device interacts with the drive to allow the cartridge to move beyond the positive insertion stop by slidably receiving the positive insertion stop in the underside slot for loading the cartridge into the drive when the drive is positioned at one of the plurality of data cartridge slots,
    wherein the cartridge includes a leading edge, the prevent device includes an angled cam, and underside slot extends along the underside of the cartridge less than the entire length of the cartridge and includes a underside slot end, and the positive insertion stop and cam are spaced relative to each other so that the leading edge of the cartridge engages the angled cam, forcing the prevent device to rotate downward, lowering the positive insertion stop to an out-of-way position, before the positive insertion stop engages the underside slot end.

10. An autoloader, comprising:
    a housing having a plurality of data cartridge slots;
    a drive that is movable between the data cartridge slots; and
    a prevent device located within each of the plurality of data cartridge slots and prohibiting insertion of a data cartridge into the data cartridge slot if the data cartridge is not properly oriented, the prevent device including a positive insertion stop and a cam offset rearward relative to the positive insertion stop so that upon insertion of the data cartridge into the data cartridge slot a leading edge of the data cartridge engages the cam, forcing the positive insertion stop to an out-of-the-way position, before the positive insertion stop stops insertion of the data cartridge into the data cartridge slot.

11. The autoloader of claim 10, wherein the data cartridge is configured to receive the positive insertion stop at least partially therein with insertion of the data cartridge into the data cartridge slot.

12. The autoloader of claim 10, wherein the positive insertion stop includes a pair of tabs and the cartridge includes an underside with a pair of underside slots configured to slidably receive the pair of tabs at least partially therein.

13. The autoloader of claim 10, wherein the cartridge includes an underside with a slot extending less than the entire length of the cartridge.

14. The autoloader of claim 13, wherein cartridge includes a length and the underside slot extends along the underside of the cartridge roughly one third the length of the cartridge.

15. The autoloader of claim 10, wherein the prevent device is spring-loaded.

16. The autoloader of claim 10, wherein the cam is angled and the leading edge of the cartridge engages the angled cam, forcing the prevent device to rotate downward, lowering the positive insertion stop to the out-of-the-way position.

17. The autoloader of claim 16, wherein the cartridge includes a length and an underside with a slot extending along the underside of the cartridge less than the entire length of the cartridge, the underside slot including a slot end, and the positive insertion stop and cam are spaced relative to each other so that the leading edge of the cartridge engages the angled cam, forcing the prevent device to rotate downward, lowering the positive insertion stop to the out-of-the-way position, before the positive insertion stop engages the underside slot end.

* * * * *